Patented Oct. 30, 1951

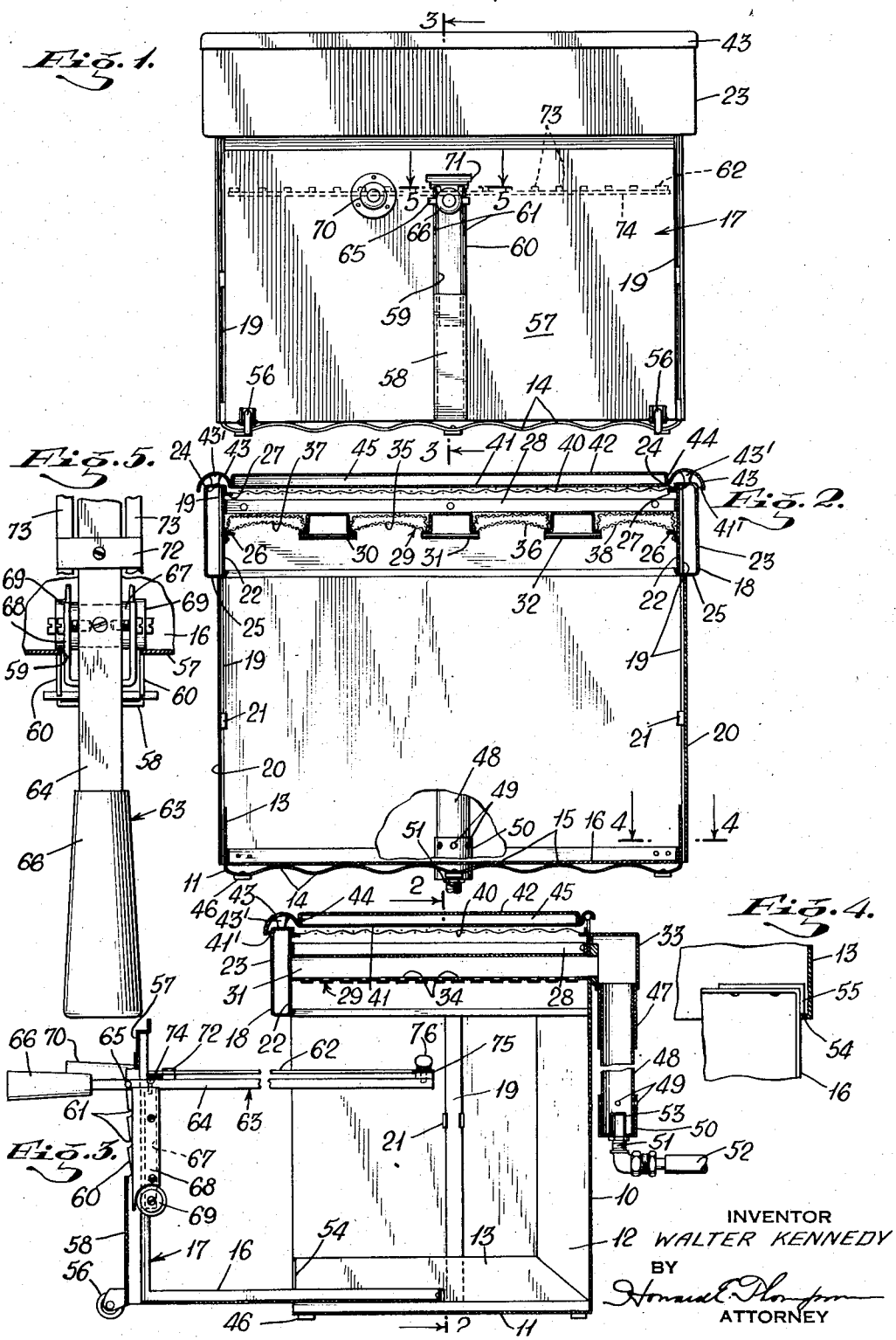

2,572,870

UNITED STATES PATENT OFFICE 2,572,870

BROILER

Walter Kennedy, Cliffside Park, N. J.

Application November 20, 1947, Serial No. 787,239

9 Claims. (Cl. 99—339)

This invention relates to kitchen appliances which for sake of general description can be referred to as "broilers." More particularly, the invention deals with an appliance of this type and kind which may in certain uses thereof be portable and which can be used as a toaster, grill or other hot plate. Still more particularly, the invention deals in a broiler appliance wherein a food supporting element of the broiler has means for quickly and easily adjusting the position thereof with respect to the heating element employed, means being further provided for movably supporting the element to facilitate movement into and out of the appliance.

The novel features of the invention will be best understood from the following description when taken together with the accompanying drawing, in which certain embodiments of the invention are disclosed, and in which the separate parts are designated by suitable reference characters in each of the views; and in which:

Fig. 1 is a front view of a broiler made according to my invention.

Fig. 2 is a section on the line 2—2 of Fig. 3.

Fig. 3 is a section on the line 3—3 of Fig. 1, showing the food supporting element in a parallel extended position and with parts of the construction broken away.

Fig. 4 is an enlarged sectional detailed view on the line 4—4 of Fig. 2, with parts in a different position; and Fig. 5 is an enlarged sectional view on the line 5—5 of Fig. 1.

In the construction shown, the broiler comprises a box-shaped casing, consisting of a back wall 10 and bottom wall 11, both having inturned flanges forming parts of side walls, as at 12 and 13 respectively, note Fig. 3. The bottom wall 11 is preferably corrugated, as clearly seen at 14, in Fig. 2 of the drawing, the corrugations extending forwardly and backwardly, thus providing spaced bearing portions, as at 15 for the free movement of the supplemental bottom or pan 16, which forms part of the product supporting and front cover unit, generally identified by the reference character 17.

Extending around the front and sides of the top part of the casing is a double-walled housing 18 which is secured to the upper end of the back wall and to upwardly extending rods 19 at side portions of the casing. The open sides of the casing are preferably closed by side panels 20 which extend over the flanges 12 and 13 and are held in position on the rods 19 by spring clips 21. The housing 18 comprises an inner wall 22 to which the upper ends of the rods 19 are secured and an outer wall 23 which may be suitably finished for decorative purposes, the latter wall having inturned upper and lower edges 24 and 25. Secured to the inner surface of the inner side walls 22 of the housing are angle-iron brackets 26 and 27 and an annular strap or band 28 which also extends onto and is secured to the inner surface of the back wall 10, as will clearly appear in Fig. 3 of the drawing.

Arranged within the housing portion 18 of the broiler and supported by the brackets 26 and the band 28 is a radiant heating unit 29 comprising three burner tubes 30, 31 and 32 which extend through the back wall 10 and open into a manifold 33. In Fig. 3 of the drawing, the burner tube 31 is shown so mounted and extended. Each burner tube is of the same general construction and has at opposite sides thereof tubular discharges spaced longitudinally of the tube, the discharges being of the form clearly illustrated at 34, in Fig. 3. Between the burner tubes 30—31 is a wire or other radiant body 35 and between the tubes 31—32 is a similar body 36 and beyond the sides of the tubes 30—32 are other radiant bodies 37 and 38. All of these radiant bodies define combustion and heat radiating sections, and it will be understood that the outer burners 30—32 supply the radiants 37—38, whereas the radiants 35—36 are supplied by the burners 30—31 and 31—32. The unit 29 provides a distribution of heat across the entire upper portion of the casing.

Supported upon the upper bracket 27 is a wire mesh body or open-work grill 40 which upon removal of a grill or griddle plate 41 and cover plate 42, may be utilized as a toaster for toasting bread, rolls and the like, or for quick heating of pastry, doughnuts, or the like. It will also be understood that the griddle plate 41 may also be used for this purpose or for cooking griddle cakes or preparing fried foods of any type or kind, as in other grill plates. The griddle plate 41 has raised peripheral edges, as at 43. This edge has spaced downwardly extending lugs 43' which bear on the flange portions 24 to form vent passages 41' at the periphery of the griddle plate 41. The cover plate 42 has downwardly extending flanges 44 so as to provide a space 45 between the cover plate 42 and the griddle plate 41. The cover plate may be utilized as a heating medium, particularly where a slower and less indirect heat is required.

The bottom wall 11 has at corner portions supporting feet 46 to maintain the casing above a supporting surface and also to protect this surface. These feet may be composed of fibre or similar material. Extending downwardly from the manifold 33 centrally thereof is a sleeve portion 47 in which is mounted a pipe 48. The lower end of the pipe 48 has a plurality of circumferentially spaced apertures 49 for admitting air and registering with these apertures and controlling the same, is a rotatably adjustable sleeve valve 50 on a nozzle fitting 51 for supply of gas to the pipe 48 from a source of supply through the medium of a pipe or hose 52. The fitting 51, including the sleeve valve 50 can be mounted upon or constitute part of an ordinary gas stove and extend upwardly near the rear portion of the top of the stove so as to receive the pipe 48 so that in making an assemblage, the complete broiler can simply be placed upon the top of the stove with the pipe 48 extending downwardly into the sleeve 50. Gas discharged from the nozzle portion 53 of the nozzle unit will mix with the air and the gaseous mixture will extend into the manifold 33 and be supplied to the three burner tubes 30, 31 and 32.

The forward edge portions of the flanges 13 on the bottom wall 11, have inturned stop flanges 54, note Fig. 4, adapted to be engaged by stop members 55 at the outer rear side portions of the tray or pan 16. This checks outward movement of the unit 17, while at the same time, will permit detachment of the unit by raising the pan 16 sufficiently to clear the stop flanges 54. The forward end of the unit 17 has at the front side portions thereof, rollers 56 for supporting and guiding the unit 17 in its movement into open and closed positions, the unit 17 being shown in a partially open position in Fig. 3 of the drawing. The unit 17 comprises a frame which includes a front or cover wall 57, and the supplemental bottom or pan 16, the lower portion of the cover wall 57 is pressed outwardly at the center thereof to form a guide channel 58. Above this channel the front wall has an opening 59 which is bordered by notched outwardly extending flanges 60, the notches being indicated at 61. These notches provide four positionings of an openwork food supporting plate or grill 62 of a food supporting element, generally identified by the reference character 63, in the casing and with respect to the radiant unit 29. The element 63 is shown supported in the uppermost notches in Figs. 1 and 3 and the lowermost support of the element would be at the upper end of the offset channel portion 58, as will clearly appear from a consideration of Fig. 3 of the drawing.

The element 63 comprises a center and relatively substantial supporting rod 64, the outer end portion of the rod 64 has a crossed pivot pin 65 adapted to be fitted into the notches 61 and beyond the pivot 65 is a handle member 66. Secured to the rod 64 adjacent but inwardly of the pivot 65 is a downwardly extending bar or arm 67 to which is secured a U-shaped plate 68 which fits snugly but freely within the notched flanges 60 and the housing 58 and guides the element 63 in its vertical adjustment in the unit 17. Supported upon the lower end of the extending finger or arm 67 are two flanged wheels 69 adapted to bear upon the inner surface of the wall 57 of the unit 17 adjacent the flanges 60 and channel 58, with the flanges of said wheels disposed within the aperture 59. It will thus be seen that by simply pulling outwardly on the handle 66 to a slight extent, sufficiently to disengage the pin 65 from the engaged notch 61, the element 63 may be raised and lowered and freely guided and supported in this operation by the wheels 69. In this respect the wheels act as pivots around which the element 63 is free to swing, the weight of the element being greatest at the inner ends thereof, which forces and holds the pin 65 in any engaged notch and this weight is materially increased if any food is supported upon the openwork shelf or grill 62.

In the construction shown, noting Fig. 1 of the drawing, at the left of the handle 66 is a supplemental handle 70 which is secured to the front wall 57 and this handle is to be grasped by one hand in the operation of pulling outwardly on the handle 66 and in adjusting the element 63 vertically. The supplemental handle 70 also is utilized in moving the unit 17 inwardly and outwardly with respect to the casing.

One of the distinctive features of my invention resides in the fact that the unit 17 may be substantially fully exposed beyond the casing for placement of food upon the supporting shelf or grill 62 preparatory to moving the same into the casing to be broiled by the radiant heating unit 29. Further, the element 63 may be conveniently adjusted toward and from the unit 29 in broiling foods of different types and kinds, or in different suggestions of broiling. For example, in the early stages and for a quick heating of the exposed surface of the food the element 63 will be supported in the upper notch, as shown in Fig. 1 of the drawing. After a quick broiling on one upper side of the food, the unit 17 may be moved outwardly, the food turned to expose the other side, and then after having quickly heated both sides, the element 63 may be lowered to the second, third or fourth notch for a slower heating or broiling, as desired. In some instances, and with some foods, all of the broiling will be done with the element 63 in the top notches or in the next to the highest notches. By using a heating unit or radiant heating unit of the character described, very intense heat and wide distribution of heat is provided in a relatively short period of time, so that the broiling operation may be performed in a much quicker time than is experienced with conventional type of oven broilers. From this standpoint, my improved broiler becomes highly efficient.

Considering Fig. 1 of the drawing, it will appear that the upper end of the aperture 59 is enlarged, as seen at 71 to an extent sufficient to clear the pin 65. By means of this construction, the entire unit 63 may be quickly and easily detached from the front wall 57 for cleaning or other purposes, the handle 66 passing inwardly through the opening 59 in detaching the element 63. The rod 64 has adjacent the door 57 a lug 72 of sufficient width to seat snugly between forwardly and backwardly extending spaced bars 73 of the grill 62 to key a forward or outer portion of the grill on the rod. The bars 73 are joined at the forward and rear ends of the grill in crossbars or slats 74—75, and in securing the grill 62 in position, a wing screw 76 is passed through the rear cross slat 75 and into the rod 64. With this construction, the grill 62 may be removed from the rod 64 for cleaning or other purposes.

Considering Fig. 2 of the drawing, it will appear that when the griddle plate 41 is mounted in position, a discharge is provided for products of combustion outwardly over the upper edge of the casing, and these products are directed downwardly by virtue of the rounded contour of the edge 43 of the griddle. It will also appear that if the hot plate 42 is mounted directly upon the grill 40 with the griddle 41 removed, the flanges 44 of the hot plate are disposed inwardly of the brackets 27 to provide exhaust for products of combustion at the periphery of the plate 42.

It will be apparent that the illustrations in the accompanying drawing show what might be termed an economical form of broiler. However, this broiler, particularly from the casing structure standpoint may be made as elaborate as desired from a standpoint of attractive appearance and the same would apply to the unit 17. Units of this type and kind instead of being portable can be built into and constitute an integral part of an appliance, such as a range or stove. In household broilers, the casing will be made of sufficient size to broil a steak suitable for service to an average family of six or eight, whereas in restaurants and other uses, the broiler may be made of a larger capacity size, or may comprise a series of units of the general type and kind herein illustrated.

Aside from the broiler uses, the appliance will have very practical and advantageous uses in the home for preparing any type or kind of food, including the preparation of toast or any heating of food products, such as rings, pastries, doughnuts and the like, where a slight quick heating is desirable to give freshness thereto. On the other hand, the grill plate 41 and/or the top hot plate 42 may be utilized for the purposes herein indicated, or any other purpose of this kind.

With broilers of the type and kind under consideration, I have found that by reason of the quick and efficient operation of the broiler, substantially little or no smoke is experienced. In fact, I have found that the broiling operation can be performed without the use of side walls, and for this reason, the side wall plates 20 are made quickly detachable through the medium of the spring clips 21. It will thus be optional with the user as to whether or not these plates will be employed in broiling certain foods.

Having fully described my invention, what I claim as new and desire to secure by Letters Patent is:

1. An appliance of the character described, comprising a box-shaped casing, a radiant heating unit in the upper portion of said casing, a food supporting unit mounted for sliding movement into and out of said casing, said last named unit comprising a frame having a wall for closing the front of the casing, a food supporting element adjustable in the frame, said wall of the food supporting unit having a vertically arranged portion, said element slidably engaging said portion, and said element and vertical portion having interengaging means for supporting the element in different raised positions on said wall and with respect to said radiant unit.

2. An appliance of the character described, comprising a box-shaped casing, a radiant heating unit in the upper portion of said casing, a food supporting unit mounted for sliding movement into and out of said casing, said last named unit comprising a frame having a wall for closing the front of the casing, a food supporting element adjustable in the frame, said wall of the food supporting unit having a vertically arranged portion, said element slidably engaging said portion, said element and vertical portion having interengaging means for supporting the element in different raised positions on said wall and with respect to said radiant unit, said element having a handle member arranged outwardly of said wall for manual movement of the element into different positions, and rollers on the lower end of said wall for guiding the food supporting unit over a surface on which the appliance is arranged in movement of the food supporting unit into and out of said casing.

3. An appliance of the character described, comprising a box-shaped casing, a radiant heating unit in the upper portion of said casing, a food supporting unit mounted for sliding movement into and out of said casing, said last named unit comprising a frame having a wall for closing the front of the casing, a food supporting element adjustable in the frame, said wall of the food supporting unit having a vertically arranged portion, said element slidably engaging said portion, said element and vertical portion having interengaging means for supporting the element in different raised positions on said wall and with respect to said radiant unit, and an openwork grill arranged above and in spaced relation to said radiant unit.

4. An appliance of the character described, comprising a box-shaped casing, a radiant heating unit in the upper portion of said casing, a food supporting unit mounted for sliding movement into and out of said casing, said last named unit comprising a frame having a wall for closing the front of the casing, a food supporting element adjustable in the frame, said wall of the food supporting unit having a vertically arranged portion, said element slidably engaging said portion, said element and vertical portion having interengaging means for supporting the element in different raised positions on said wall and with respect to said radiant unit, and a griddle plate arranged above and in spaced relation to said radiant unit.

5. An appliance of the character described, comprising a box-shaped casing, a radiant heating unit in the upper portion of said casing, a food supporting unit mounted for sliding movement into and out of said casing, said last named unit comprising a frame having a wall for closing the front of the casing, a food supporting element adjustable in the frame, said wall of the food supporting unit having a vertically arranged portion, said element slidably engaging said portion, said element and vertical portion having interengaging means for supporting the element in different raised positions on said wall and with respect to said radiant unit, an openwork grill arranged above and in spaced relation to said radiant unit, and a detachable griddle plate arranged above said openwork grill.

6. An appliance of the character described, comprising a box-shaped casing, a radiant heating unit in the upper portion of said casing, a food supporting unit mounted for sliding movement into and out of said casing, said last named unit comprising a frame having a wall for closing the front of the casing, a food supporting element adjustable in the frame, said wall of the food supporting unit having a vertically arranged portion, said element slidably engaging said portion, said element and vertical portion having interengaging means for supporting the element in different raised positions on said wall and with respect to said radiant unit, an openwork grill arranged above and in spaced relation to said radiant unit, a detachable griddle plate arranged above said openwork grill, the sides of said casing being open, and detachable cover plates for closing said open sides.

7. An appliance of the character described, comprising a box-shaped casing, a radiant heating unit in the upper portion of said casing, a food supporting unit mounted for sliding movement into and out of said casing, said last named unit comprising a frame having a wall for closing the front of the casing, a food supporting element adjustable in the frame, said wall of the food supporting unit having a vertically arranged portion, said element slidably engaging said portion, said element and vertical portion having interengaging means for supporting the element in different raised positions on said wall and with respect to said radiant unit, a vertically arranged tube on the casing extending from the radiant unit to the lower end of the casing, and the lower end of said tube being open for supply of gas thereto from a source of gas supply.

8. An appliance of the character described, comprising a box-shaped casing, a radiant heating unit in the upper portion of said casing, a food supporting unit mounted for sliding movement into and out of said casing, said last named unit comprising a frame having a wall for closing the front of the casing, a food supporting element adjustable in the frame, said wall of the food supporting unit having a vertically arranged portion, said element slidably engaging said portion, said element and vertical portion having interengaging means for supporting the element in different raised positions on said wall and with respect to said radiant unit, said element having a hand-grip portion arranged outwardly of said wall, and said element having a vertically disposed part arranged and operating upon the inner surface of said wall in guiding said element in adjustment thereof vertically on said wall.

9. In an appliance of the character described, comprising a box-shaped casing open at the front and having radiant heating means in the upper portion of the casing, a food supporting unit independent of and freely insertable into and removable from the casing through the front opening thereof, said unit comprising a frame having a vertical wall forming a door closure for the opening of said casing, a food supporting element adjustably supported solely on and by said wall, said wall having a vertically arranged portion, said element slidably engaging said portion in movement of the element vertically on said wall, means on said element and vertical portion for supporting said element in different raised positions on said wall, and means guiding said element in its vertical adjustment on said wall.

WALTER KENNEDY.

REFERENCES CITED

The following references are of record in the file of this patent:

UNITED STATES PATENTS

| Number | Name | Date |
|---|---|---|
| 1,263,359 | Armstrong | Apr. 23, 1918 |
| 1,279,237 | Borucheix | Sept. 17, 1918 |
| 1,537,499 | Schmidt | May 12, 1925 |
| 1,614,167 | Wilkinson | Jan. 11, 1927 |
| 1,694,762 | Ackerman | Dec. 11, 1928 |
| 1,736,223 | Silen | Nov. 19, 1929 |
| 1,751,219 | Seamon | Mar. 18, 1930 |
| 2,204,381 | Reeves | June 11, 1940 |
| 2,221,870 | Kahn et al. | Nov. 19, 1940 |
| 2,331,707 | Lotter | Oct. 12, 1943 |
| 2,335,217 | Tate | Nov. 23, 1943 |
| 2,362,415 | Sivley | Nov. 7, 1944 |
| 2,459,657 | Klein | Jan. 18, 1949 |